(12) United States Patent
Hamburgen et al.

(10) Patent No.: US 10,713,978 B2
(45) Date of Patent: Jul. 14, 2020

(54) BEND LIMIT FILM

(71) Applicant: GOOGLE LLC, Mountain View, CA (US)

(72) Inventors: William Riis Hamburgen, Palo Alto, CA (US); Yi Tao, San Jose, CA (US); Bruce Schena, Menlo Park, CA (US); James Cooper, Sunnyvale, CA (US); John Stuart Fitch, Los Altos, CA (US); Jeffrey Hayashida, San Francisco, CA (US); Avi Hecht, Mountain View, CA (US); Lawrence Lam, San Jose, CA (US); Andreas Nowatzyk, San Jose, CA (US); Jonathan Nivet, Mountain View, CA (US); Kelvin Kwong, San Jose, CA (US); Kiarash Vakhshouri, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 15 days.

(21) Appl. No.: 16/001,413

(22) Filed: Jun. 6, 2018

(65) Prior Publication Data

US 2018/0348821 A1    Dec. 6, 2018

Related U.S. Application Data

(60) Provisional application No. 62/515,882, filed on Jun. 6, 2017.

(51) Int. Cl.
*G06F 9/30* (2018.01)
*G09F 9/30* (2006.01)
(Continued)

(52) U.S. Cl.
CPC ........ *G09F 9/301* (2013.01); *G02F 1/133305* (2013.01); *G06F 1/1652* (2013.01);
(Continued)

(58) Field of Classification Search
CPC .... G06F 1/1652; G09F 9/301; G09G 2380/02
See application file for complete search history.

(56) References Cited

U.S. PATENT DOCUMENTS 7,641,381 B2 * 1/2010 Levingston ........... F16F 1/3665
                                                                368/127
9,940,892 B2 * 4/2018 Pang ........................ G09G 5/00
(Continued)

FOREIGN PATENT DOCUMENTS

TW    201539175 A    10/2015
WO    2015100404 A1   7/2015

OTHER PUBLICATIONS

International Search Report and Written Opinion for International Application No. PCT/US2018/036257, dated Nov. 22, 2018, 20 pages.

(Continued)

*Primary Examiner* — Gene W Lee
(74) *Attorney, Agent, or Firm* — Brake Hughes Bellermann LLP

(57) ABSTRACT

A computing device includes memory configured for storing executable instructions, a processor configured for executing the instructions, a foldable display layer configured for displaying information in response to the execution of the instructions, and a bend limit layer coupled to the foldable display layer and arranged substantially parallel to a display surface of the foldable display layer. The bend limit layer is configured to increase its stiffness non-linearly when a radius of a bend of the bend limit layer is less than a threshold radius of curvature of the foldable display layer, (Continued)

the threshold radius of curvature being greater than 1 mm and less than 20 mm.

10 Claims, 18 Drawing Sheets

(51) Int. Cl.
  *G06F 1/16*    (2006.01)
  *G02F 1/1333*   (2006.01)
  *H04M 1/02*    (2006.01)

(52) U.S. Cl.
  CPC ....... *H04M 1/0268* (2013.01); *G02F 2201/50* (2013.01); *G09G 2380/02* (2013.01)

(56) References Cited

U.S. PATENT DOCUMENTS

| | | | | |
|---|---|---|---|---|
| 2006/0225526 | A1* | 10/2006 | Levingston | F16F 1/3665 74/1 SS |
| 2008/0176020 | A1* | 7/2008 | Heng | C04B 41/5031 428/49 |
| 2014/0037930 | A1* | 2/2014 | Sun | C08G 73/1078 428/220 |
| 2015/0185761 | A1* | 7/2015 | Song | G06F 1/1601 361/679.21 |
| 2015/0200375 | A1* | 7/2015 | Kim | G09F 9/301 257/40 |
| 2016/0014919 | A1* | 1/2016 | Huitema | G06F 1/1652 313/511 |
| 2016/0202782 | A1 | 7/2016 | Park et al. | |
| 2017/0212556 | A1* | 7/2017 | Jovanovic | G06F 1/1652 |
| 2017/0223821 | A1* | 8/2017 | Wang | D01D 5/0084 |
| 2018/0182330 | A1* | 6/2018 | Hosoumi | G09G 3/3648 |
| 2020/0066828 | A1* | 2/2020 | Meersman | H01L 51/5237 |

OTHER PUBLICATIONS

Office Action with English Translation for Taiwanese Application No. 107119538, dated Apr. 18, 2019, 10 pages.
Invitation to Pay Additional Fees and, Where Applicable, Protest Fee for International Application No. PCT/US2018/036257, dated Sep. 25, 2018, 16 pages.

\* cited by examiner

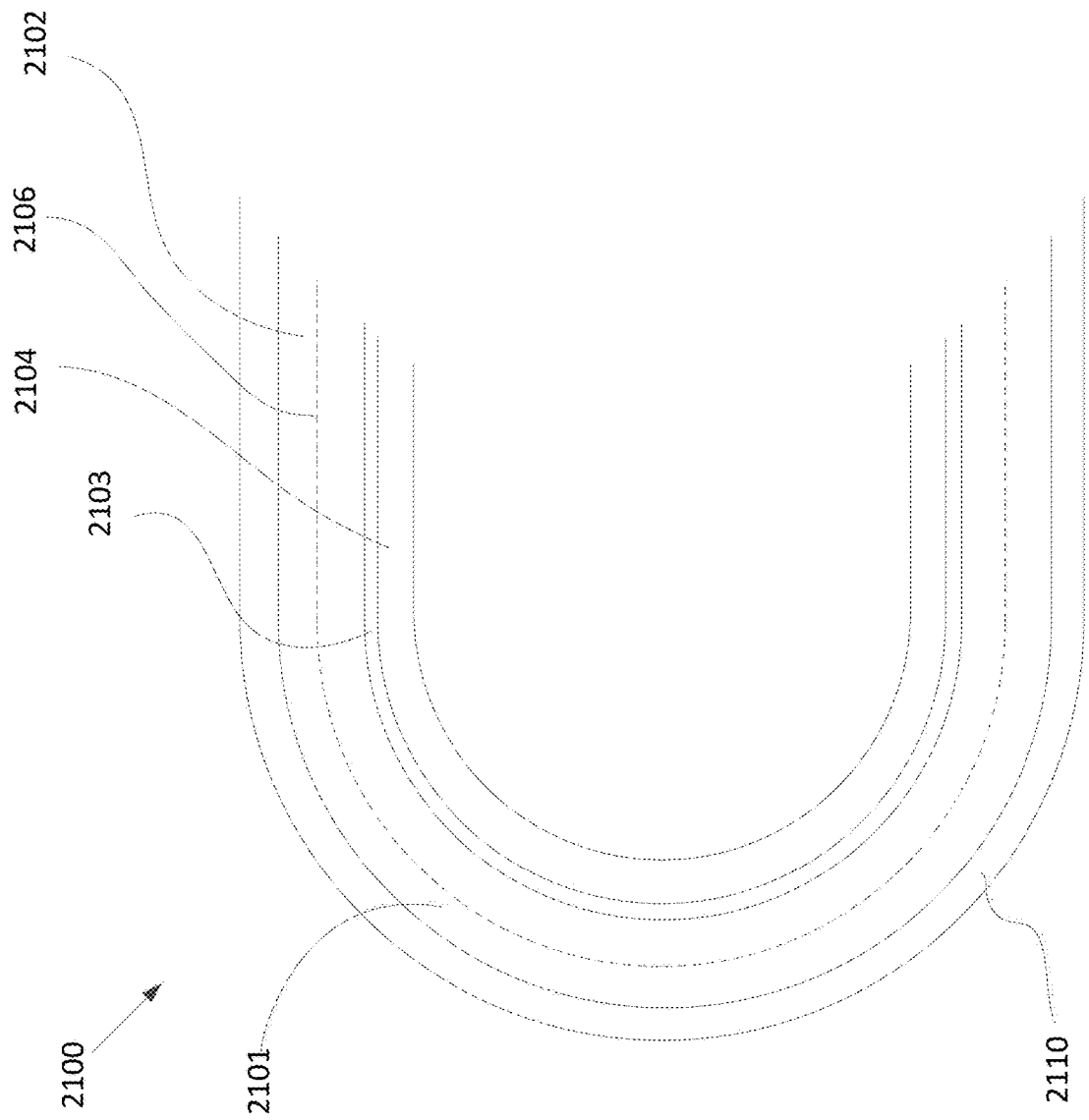

BEND LIMIT FILM

CROSS-REFERENCE TO RELATED APPLICATIONS

This application claims priority to U.S. Provisional Application No. 62/515,882, filed on Jun. 6, 2017, titled "BEND LIMIT FILM," the disclosure of which is incorporated by reference herein in their entirety.

TECHNICAL FIELD

This description relates to thin film materials and, in particular, to thin films that are limited to bending to a threshold radius.

BACKGROUND

Modern computing devices often attempt to achieve a balance between portability and functionality. A tension can exist between having a display that provides for a rich display of information on a single surface, which suggests a relatively large form factor of the device to accommodate a relatively large display, and a device that is small enough to be easily carried and accessed by a user, which suggests a relatively small form factor of the device.

A potential solution to address this dilemma is to use a foldable flexible display in the computing device, so that in the display's folded configuration, the computing device has a relatively small form factor, and in the display's unfolded configuration, the computing device can have a relatively large display. To keep the form factor of the computing device small and slim, it is desirable to have relatively thin displays. However, folding a relatively thin display can result in small radius bends at the fold in the display, which may be detrimental to sensitive components of the display, for example, thin film transistors (TFTs), organic light-emitting diodes (OLEDs), thin-film encapsulation (TFE) and the like. In addition, thin displays can be relatively fragile and in need of protection against breakage.

Accordingly, relatively thin, foldable displays that nevertheless can be bent in a small radius, but not beyond a minimum radius, and that are relatively study, are desirable for use in computing devices.

SUMMARY

In a general aspect, a computing device includes memory configured for storing executable instructions, a processor configured for executing the instructions, a foldable display layer configured for displaying information in response to the execution of the instructions, and a bend limit layer coupled to the foldable display layer and arranged substantially parallel to a display surface of the foldable display layer. The bend limit layer is configured to increase its stiffness non-linearly when a radius of a bend of the bend limit layer is less than a threshold radius of curvature of the foldable display layer, the threshold radius of curvature being greater than 1 mm and less than 20 mm.

Implementations can include one or more of the following features, For example, the bend limit layer can include a film and a plurality of distinct segments attached to the film and that are physically separated from each other when the radius of curvature of the foldable display layer is greater than the threshold radius and that are in physical contact with neighboring segments when the radius of curvature of the foldable display layer is less than or equal to the threshold radius. The display surface of the foldable display layer can form a concave surface of the foldable display layer when the foldable display layer is in a folded state. The display surface of the foldable display layer can form a convex surface of the foldable display layer when the foldable display layer is in a folded state.

The bend limit layer can include a plurality of low stretch fibers, where the fibers are arranged in the bend limit layer, such that when the radius of curvature of the foldable display layer is greater than the threshold radius, the distance between ends of each fiber in a plane of the bend limit layer is less than the length of the fiber, and such that when the radius of curvature of the foldable display layer is less than or equal to the threshold radius, the distance between ends of each fiber in a plane of the bend limit layer is approximately equal to the length of the fiber. The display surface of the foldable display layer can form a concave surface of the foldable display layer when the foldable display layer is in a folded state.

The bend limit layer includes a material whose stiffness changes non-linearly in response to a strain in the material exceeding a threshold value. The material whose stiffness changes non-linearly in response to a strain in the material exceeding a threshold value can include a foam or a gel.

The bend limit layer can include a material whose bulk modulus changes as a function of a compressive force on the material exceeding a threshold value. The material can be selected from the group consisting of a foam material and a gel material.

The bend limit layer can include a nickel titanium alloy material.

The computing device can further include a backing film coupled to the bend limit layer. The backing film can be disposed between the bend limit layer and the display layer. The backing film can include a material having a coefficient of thermal expansion within 50% of the coefficient of thermal expansion of the display layer. The backing film can include a material having a coefficient of thermal expansion within 25% of the coefficient of thermal expansion of the display layer. The backing film can include preferentially aligned fibers embedded in a polymer matrix. A combined thickness of the backing film, the display layer, and the bend limit layer is less than one millimeter.

BRIEF DESCRIPTION OF THE DRAWINGS

FIG. 21 is a schematic diagram of a foldable display having a bendable section that is bent around a minimum radius, $R_{min}$.

DETAILED DESCRIPTION

Figure 1:
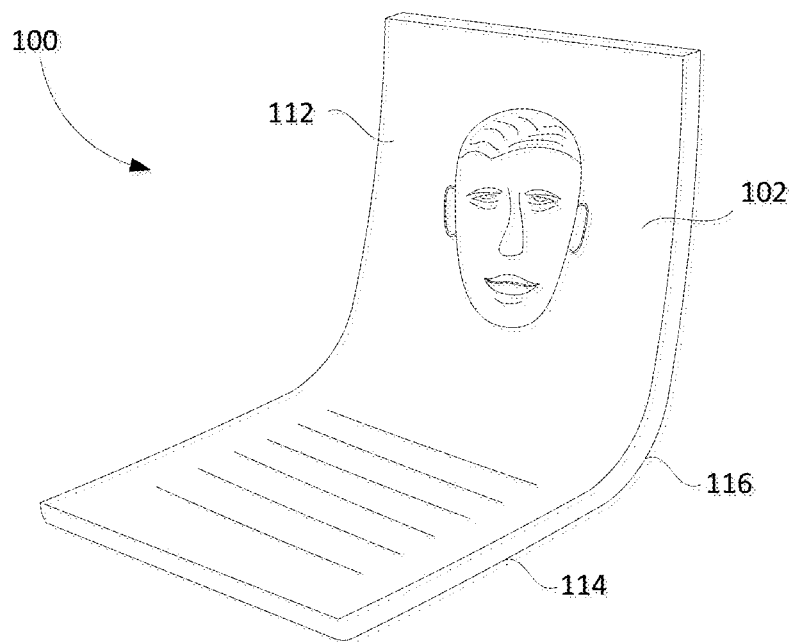
FIG. 1 is a perspective view of a computing device that includes a foldable display 102 with the foldable display in a partially folded configuration.
Figure 2:
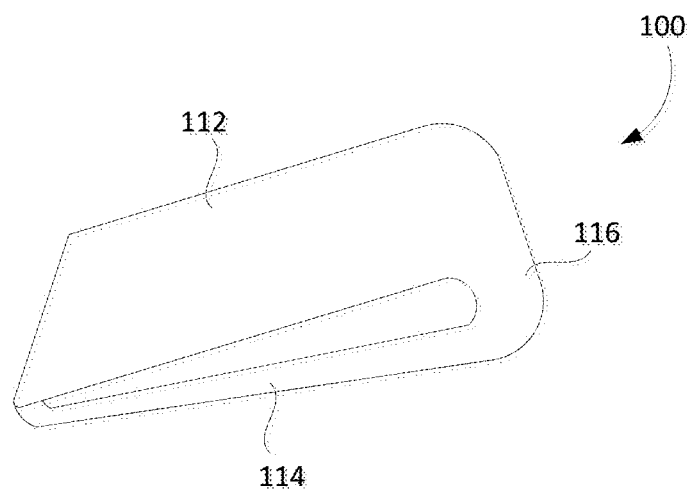
FIG. 2 is a perspective view of the computing device, with the display in a folded configuration.

FIG. 1 is a perspective view of a computing device 100 that includes a foldable display 102, with the foldable display in a partially folded configuration. The device 100 has the foldable display 102 mounted so that it folds with the viewable face inward. It is also possible to mount the foldable display 102 on the opposite side of device 100 so that the display folds with viewable face outward (not shown). FIG. 2 is a perspective view of the computing device 100, with the display 102 in a folded configuration. The foldable display 102 may be, for example, a TFT (Thin-Film-Transistor) OLED (Organic Light Emitting Diode) display, or other appropriate display technology. The foldable display 102 may comprise appropriate circuitry for driving the display to present graphical and other information to a user.

As shown in FIG. 1 and FIG. 2, the foldable display 102 can include a first relatively flat rigid, or-semi-rigid, section 112, a second flat rigid section 114, and a third bendable section 116. In some implementations, the foldable display 102 can include more than two flat rigid sections 112, 114 and more than one bendable section 116. In some implementations, the foldable display 102 can include zero, or only one, flat rigid section 112, 114. For example, when a foldable display 102 includes zero flat rigid sections, the display 102 can be continuously bendable, and can be rolled up, as in a scroll. The foldable display 102 shown in FIG. 1 and FIG. 2 has a bendable section 116 that allows the foldable display to bend about an axis. In other implementations, the foldable display 102 can include bendable sections that allow the blade to bend about more than one axis.

The bendable section 116 of the foldable display 102 allows the display 102 to bend in an arc that has a radius, and the bendable section can be made to become rigid when the radius of the bendable section reaches a specified minimum radius. This minimum radius may be selected to prevent the display from bending in a radius so small that fragile components of the display would be broken. In some implementations, the minimum radius is greater than or equal to 2.5 millimeters, or greater than or equal to 3.0 millimeters, or greater than or equal to 5 millimeters. Thus, the bendable section can be flexible when bent in a radius greater than the minimum radius and then become rigid when the bend radius is equal to or smaller than the minimum radius.

Figure 3:
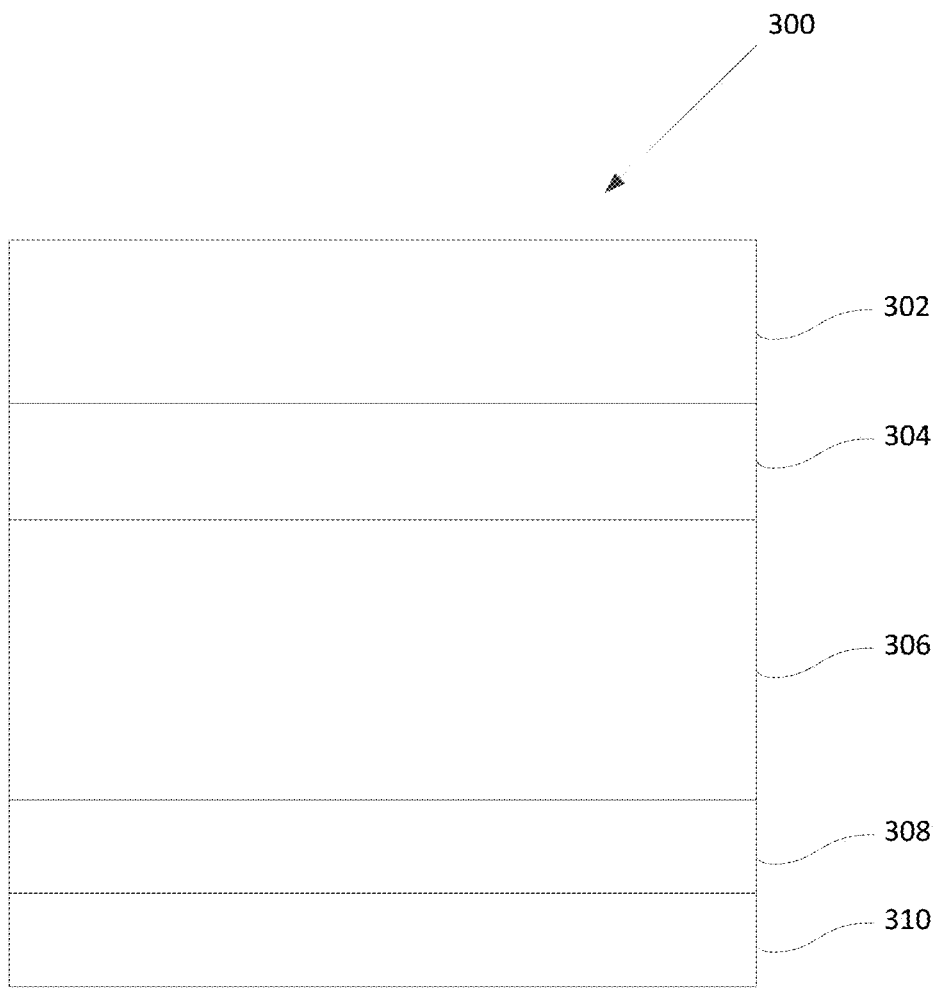
FIG. 3 is a schematic diagram of a flexible display device having a stack of a number of different layers.

FIG. 3 is a schematic diagram of a flexible display device 300 having a stack of a number of different layers. For example, in some implementations, a flexible organic light-emitting diode (OLED) layer 306 can be supported by a bend limit layer 308, and a backing film 310. In some implementations, the bend limit layer 308 can be between the OLED layer 306 and the backing film 310. In some implementations, the OLED layer 306 can be between the bend limit layer 308 and the backing film 310. An optically clear adhesive layer 304 can be applied to a front surface of the flexible OLED layer 306. A cover window film 302 can be applied to the optically clear adhesive layer 304 to protect the device on the front side. As the thickness of each layer of the stack is important to the overall thickness of the device 300, it is desirable to have a relatively thin thickness for the layers. For example, in some non-limiting examples, the thickness of the flexible OLED layer 306 can be on the order of approximately 300 µm; the thickness of the optically clear adhesive layer 304 can be on the order of approximately 100 µm; and the thickness of the cover window film can be on the order of approximately 200 µm. Thus, the thicknesses of the bend limit layer 308 and the backing film 310 are selected so as to maintain an overall thickness of the device 300 that is not too great, and also should have individual thicknesses that are fractions of a millimeter. In some implementations, the combined thickness of the backing film, the display layer, and the bend limit layer can be less than two millimeters or less than one millimeter.

The components of the stack of the device 300 have different as-fabricated properties, including stresses and strains that exist in the component when the layer is fabricated. Additional stresses and strains can be induced in the layers of the stack when the display is bent into a configuration that is different from the configuration in which the layer was fabricated. For example, if the layer was flat when it was fabricated, then additional strain can be induced by stretching or bending the layer, and if the layer was fabricated in a curved configuration, then additional strain can be induced by flattening the layer. If the bend-induced strain exceeds a threshold value characteristic of a component of the stack, the component can be damaged by the strain due to cracking, buckling, delamination, etc. This characteristic damage threshold strain may be different depending on temperature, humidity, required cycle life, and other use and environmental factors. Brittle inorganic layers of the stack can typically withstand less strain than inorganic layers before they are damaged by the strain. Nevertheless, organic materials in the stack also can be damaged by excessive strain that is induced by bending.

Figures 4, 5:
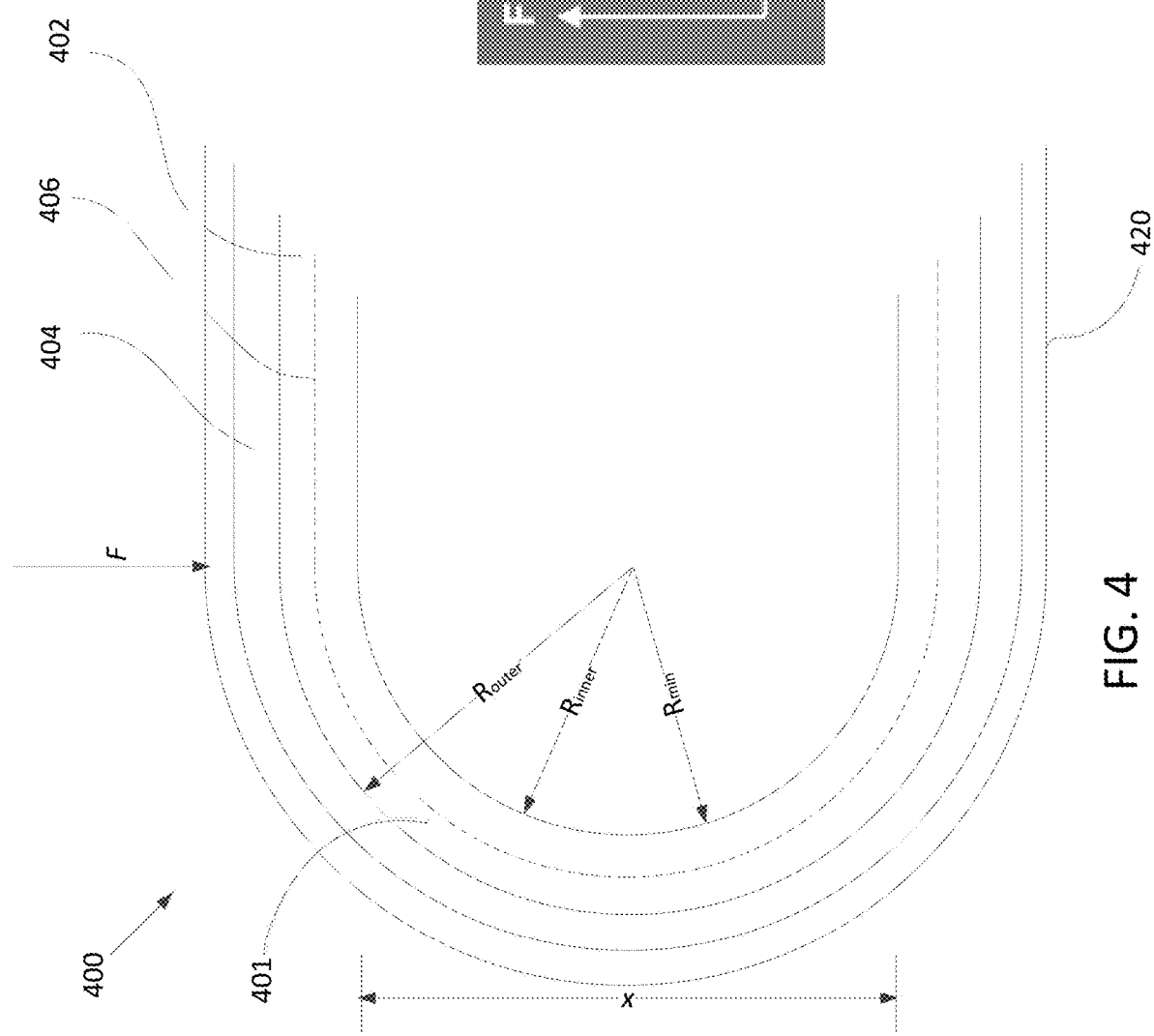
FIG. 4 is a schematic diagram of a foldable display having a bendable section that is bent around a minimum radius, $R_{min}$.
FIG. 5 is a graph showing an example stiffness curve for a foldable display in which the limit radius is reached when the foldable display is folded.

FIG. 4 is a schematic diagram of a foldable display 400 having a bendable section 401 (the curved portion shown in FIG. 4) that is bent around a minimum radius, $R_{min}$. The foldable display 400 can include a display layer 402 that includes components (e.g., OLED layers, TFT layers, touch screen layers, polarizing layers, encapsulation layers, etc.) that generate images on the display (emitted from the side of the display that faces toward the inside of the bend) and that protect the image generating layers, and a bend limit layer 404 that limits the radius at which the foldable display 400 can bend to greater than or equal to the minimum radius, $R_{min}$.

When the display layer 402 is fabricated in a flat configuration, then bending the display layer 402 in the absence of the bend limit layer 404 may cause the bendable section to assume a radius less than the minimum radius, $R_{min}$ and induce excessive strain within the display layer 402. For example, compressive strain will be induced along the inner radius of the bend, $R_{inner}$, and tensile strain will be induced along the outer radius of the bend, $R_{outer}$. An interior portion of the display layer 402 can be characterized by a plane at which no strain is induced when the display layer 402 is bent. This plane is referred to herein as the "neutral plane" 406. If the stack of materials within the layer 402 is symmetrical about a midplane of the layer, then the neutral plane corresponds to the midplane of the layer. However, different material properties (e.g., thickness, Young's modulus, etc.) of different layers within the display layer 402 can cause the neutral plane to be displaced above or below the midplane of the layer 402. The location of the neutral plane within the layer 402, along with the maximum tolerable strain values of the materials within the layer 402, determines the minimum bend radius that can be tolerated without causing damage to components within the layer 402.

The bend limit layer 404 can be attached to the display layer 402 to provide support for the display layer 402 and also can prevent the display layer from being bent around a radius that is smaller than its minimum tolerable bend radius. A backing film 420 of the device can be reinforced with materials (e.g., reinforced with high-strength fibers) to provide strength and support for the device. Materials in backing film 420 can have a coefficient of thermal expansion (CTE) that is close to the CTE of the OLED display layer 402, so that the fragile components are not unduly stressed by thermal cycling of the device 400. For example, while many fiber materials have CTE's that are close to zero or even negative, some ceramic fibers can have CTE's on the order of 8 ppm per Kelvin. Use of such fiber materials can improve thermal expansion matching to a wide range of structures, including OLED display layers. In some implementations, the CTE of the fibers can be within about 50% of the CTE of the OLED display layer 402. In some implementations, the CTE of the fibers can be within about 25% of the CTE of the OLED display layer 402. In some implementations, the CTE of the fibers can be within about 10% of the CTE of the OLED display layer 402.

The bend limit layer 404 can be relatively flexible when it bent in radii greater than $R_{min}$ and then can become stiff and inflexible when the radius of the bend approaches, or matches, $R_{min}$. Stiffness can be parameterized by the change in bend radius per unit of applied force that causes the foldable display 400 to bend. For example, in FIG. 4, when the display is folded in half around a 180 degree bend, twice the radius of the bend is shown by the parameter, x, when a force, F, is applied to bend the foldable display. The stiffness of the foldable display 400 then can be parameterized by the derivative, k=dF/dx. The strength of the foldable display can be characterized as the maximum force, F, that the foldable display 400 can withstand before failure of the display occurs.

When the foldable display 400 is laid flat in its folded configuration it can be maintained in its folded configuration by the force of gravity on the upper folded portion of the display, such that zero additional force is needed to be applied to the upper folded portion to maintain the foldable display in its flat folded configuration, or, in other implementations, additional force can be applied by external means such as latches, magnets, etc. to maintain the display in its folded configuration. In this configuration the radius of the bend can be defined as the limit radius, $R_{limit}$, i.e., the radius at which the bend limit layer 404 limits the further bending of the foldable display unless additional external force is applied. To bend the foldable display further from this configuration requires additional external force to overcome the stiffness of the bend limit layer. Thus, an example stiffness curve for a foldable display in which the limit radius is reached with the foldable display is folded 180 degrees, showing stiffness as a function of x is shown in FIG. 5.

It can be advantageous to have a foldable display with a stiffness curve that exhibits a relatively sharp increase in stiffness once the limit radius is reached, such that the foldable display can be easily folded into its folded configuration in which $R_{limit}$ is close to $R_{min}$, and then the foldable display will become quite stiff, such that it remains in this configuration despite forces pressing it toward a radius smaller than $R_{limit}$.

Figure 6:
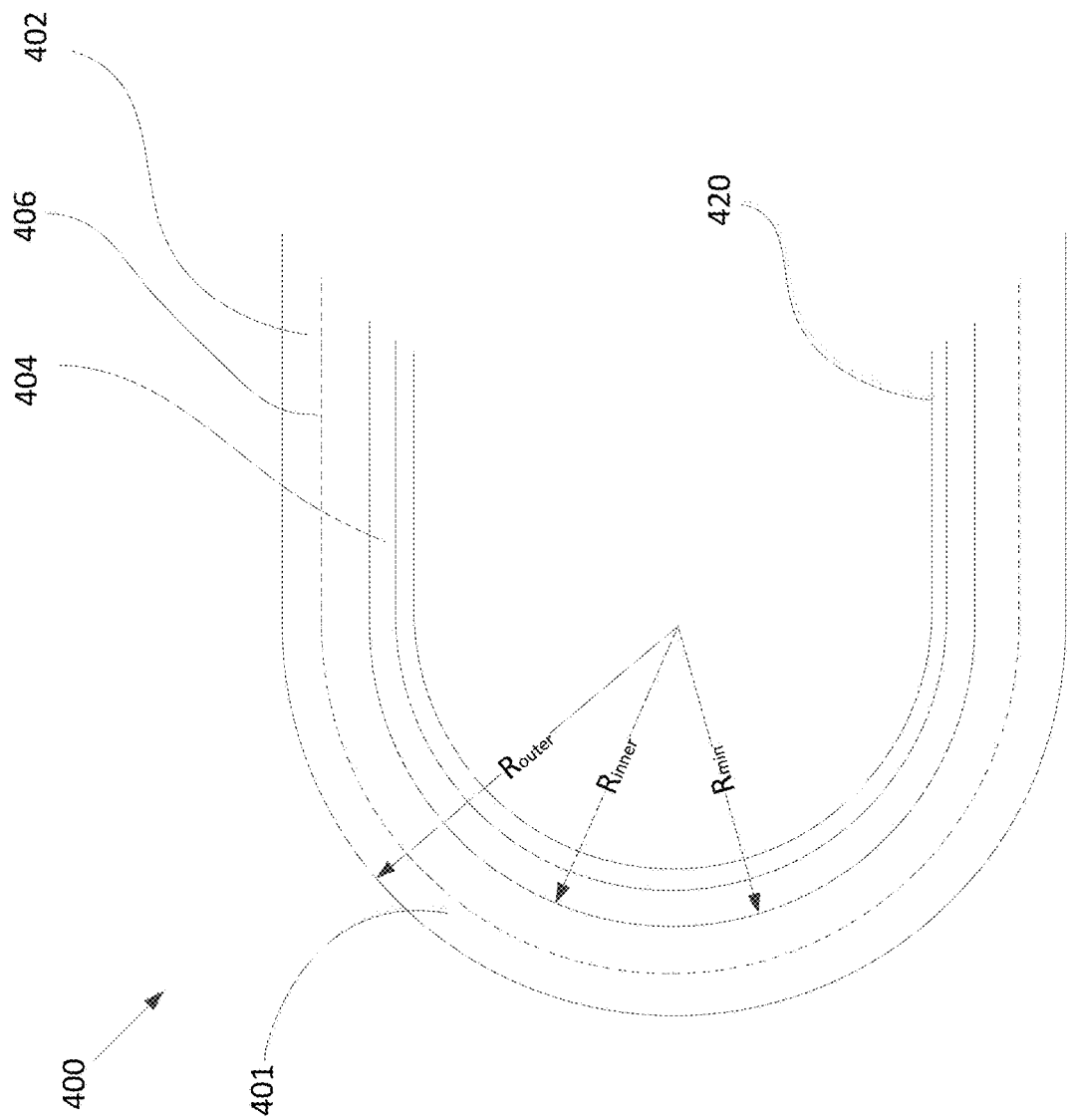
FIG. 6 is a schematic diagram of a foldable display having a bendable section that is bent around a minimum radius, $R_{min}$.

The bend limit layer 404 is shown on the outside of the bend in FIG. 4, but also can be on the inside of the bend, for example, as shown in FIG. 6, in which case the content displayed by the display is on the outside of the bend and the backing film 620 is on the inside of the bend.

Figure 7A:
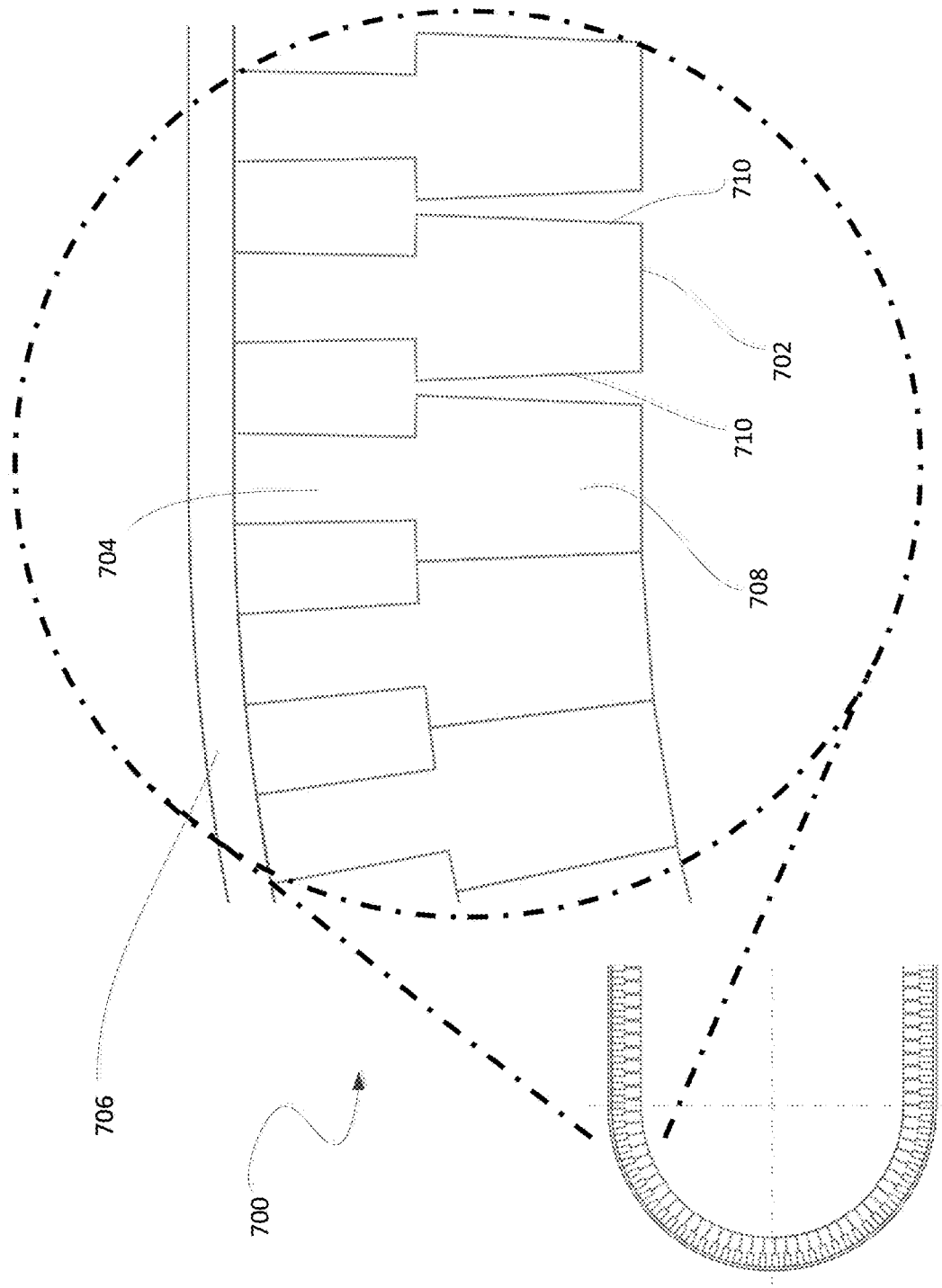
FIG. 7A is a schematic diagram of an example implementation of a bend limit layer.
Figure 7B:
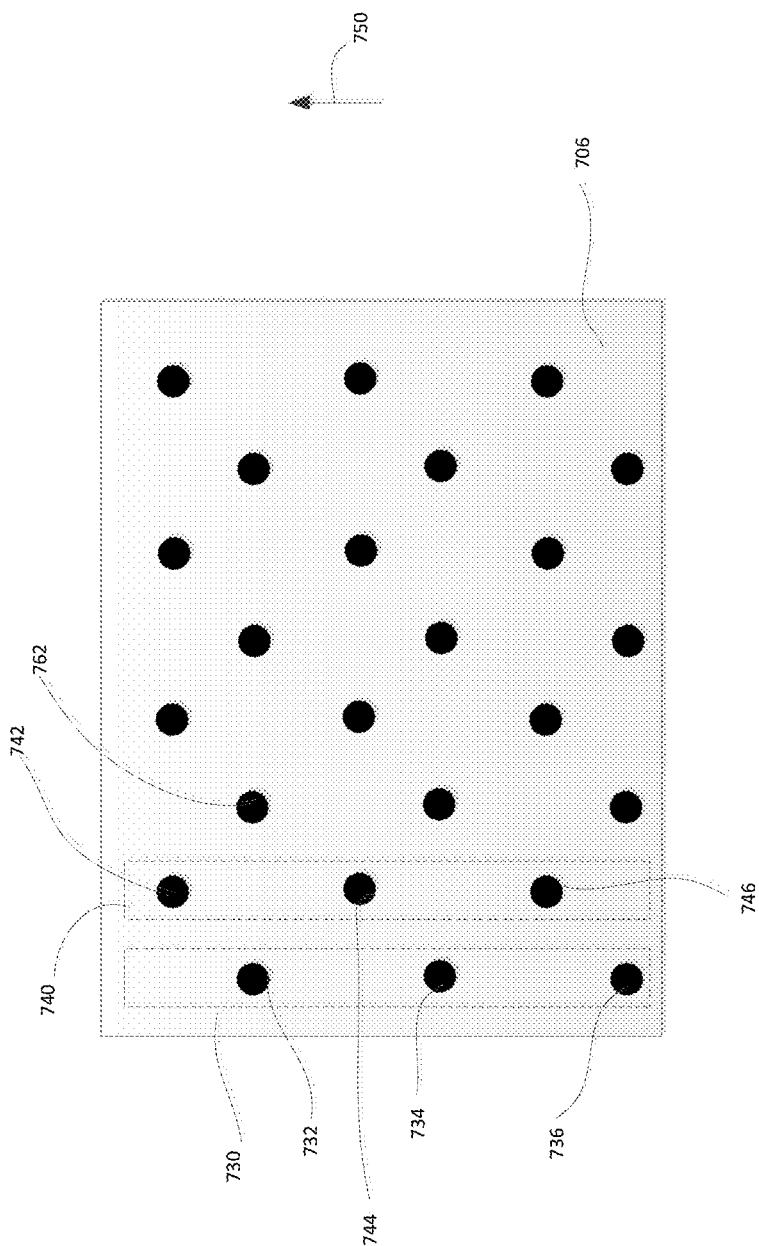
FIG. 7B is a top view of a thin film showing a plurality of bonding sites at which the film is bonded to the base portions of different adjacent segments.

FIG. 7A is a schematic diagram of an example implementation of a bend limit layer 700. The bend limit layer 700 can include a plurality of adjacent segments 702 that are each separated from neighboring segments for $R>R_{limit}$ and that are in contact with neighboring segments when $R \leq R_{limit}$. In some implementations, each segment 702 can have a base portion 704 that is attached to a thin film (or foil or composite) 706 and a head portion 708 that is wider in a direction parallel to the plane of the bend limit layer 700 than the base portion 704. For example, the thin film 706 can be bent in radii of less than 3 mm. The thin film 706 has a thickness that is small compared with the height of the segments 706 in a direction perpendicular to the thin film 706. The stiffness of the thin film 706 is low, so that the bend limit layer 700 is easily bent for radii $R \geq R_{limit}$. The thin film 706 can be bent in radii small enough to accommodate the design parameters of the bend limit layer 700. In one non-limiting example, the thin film 706 can have a thickness of about 50 μm and when bend into a radius of 2.5 mm can experience a 1% strain. Of course, the thickness of the material can be adjusted to trade off advantages between different parameters, for example, the minimum radius of the thin film can be bent into, the strength of the thin film, and the stiffness of the thin film.

One example material that could be used is the polyimide film known as Kapton® HN available from DuPont in thicknesses of 7.6 μm, 12.7 μm, 25.4 μm 50.8 μm, etc. Another example material that could be used is a thin metal foil. For example, a 12 μm thick stainless steel foil has a strain of about 0.3% when bend into a radius of 2 mm.

In the example implementation shown in FIG. 7A, the bond line between the base portions 708 and the thin film 706 covered by 50% of one surface of the thin film 706. In other words, half of the surface of the thin film 706 is attached to base portions 704 of adjacent segments 702, and half of the surface is unattached. Other configurations are also possible, in which the bond line coverage is more or less than 50%. The portion of the thin film 706 that is bonded to the adjacent segments 702 is much stiffer than the portions that are not bonded. This increases the stain in the unbonded portions of thin film 706, and this increase must be accounted for in the materials and geometry of the bend limit layer 700. With the head portions 708 being wider than the base portions 704, such that less than 100% of the thin film 706 is covered by the base portions 708, the portions of the thin film 706 between the base portions can flex and bend to allow the bend limit layer 700 to be bent to a small radius.

In some implementations, the base portions 704 of the adjacent segments 702 are not bonded to the thin film 706 continuously in a direction into the page, as shown in FIG. 7A, and base portions 704 of adjacent segments 702 are not bonded to the thin film 706 at locations shown in the cross section of FIG. 7A. Rather, bonding sites between the base portions 704 of adjacent segments 702 and the thin film 706 can be offset in the direction into the page, as shown in FIG. 7A.

FIG. 7AB is a top view of the thin film showing a plurality of bonding sites at which the film 706 is bonded to the base portions 704 of different adjacent segments 702. For example, a first group 730 of bonding sites 732, 734, 736 can bond the film 706 to a first segment, whose footprint on the film 706 is shown by rectangle 730, and a second group 740 of bonding sites 742, 744, 746 can bond the film 706 to a second first segment, whose footprint on the film 706 is shown by rectangle 740. Because the bonding sites of adjacent segments are offset from each other along the direction 750, portions of the film 706 between adjacent segments that are not directly bonded to the segments can flex relatively easily when the bend limit film is bent into a small radius, as shown in FIG. 7A. For example, the film between bonding sites 732 and 762 that is under the second segment, whose footprint on the film 706 is shown by rectangle 740, can flex when the bend limit film is bent, even if the footprints 730 and 740 butt up against each other.

The head portion 708 of each segment 702 can have vertical sides 710 that, when the bend limit film 706 is flat, are not perfectly perpendicular to the thin film 706, but rather that are angled toward each other as they extend away from the thin film 706. Then, when the bend limit layer 700 is bent into a radius equal to $R_{limit}$, the vertical sides 710 of adjacent segments 702 become in intimate contact with, and parallel to, each other, so that they form a rigid, rugged layer of material that has a high stiffness for $R \leq R_{limit}$. Some means of fabricating the head portion 708 of each segment 702 may not have perfectly flat sides, but instead have other surface geometries that also allow both faces of adjacent segments 702 come in intimate contact with each other, so that they form a rigid, rugged layer of material that has a high stiffness for $R \leq R_{limit}$.

The segments 702 can be formed from a number of different materials including, for example, metals, polymers, glasses, and ceramics. Individual blocks can be molded, machined, drawn (e.g., through a shaped wire) and then attached to the thin film 706 at the correct spacing. In another implementation, a plurality of adjacent segments 702 can be formed simultaneously and then attached to the thin film 706.

Figure 8:
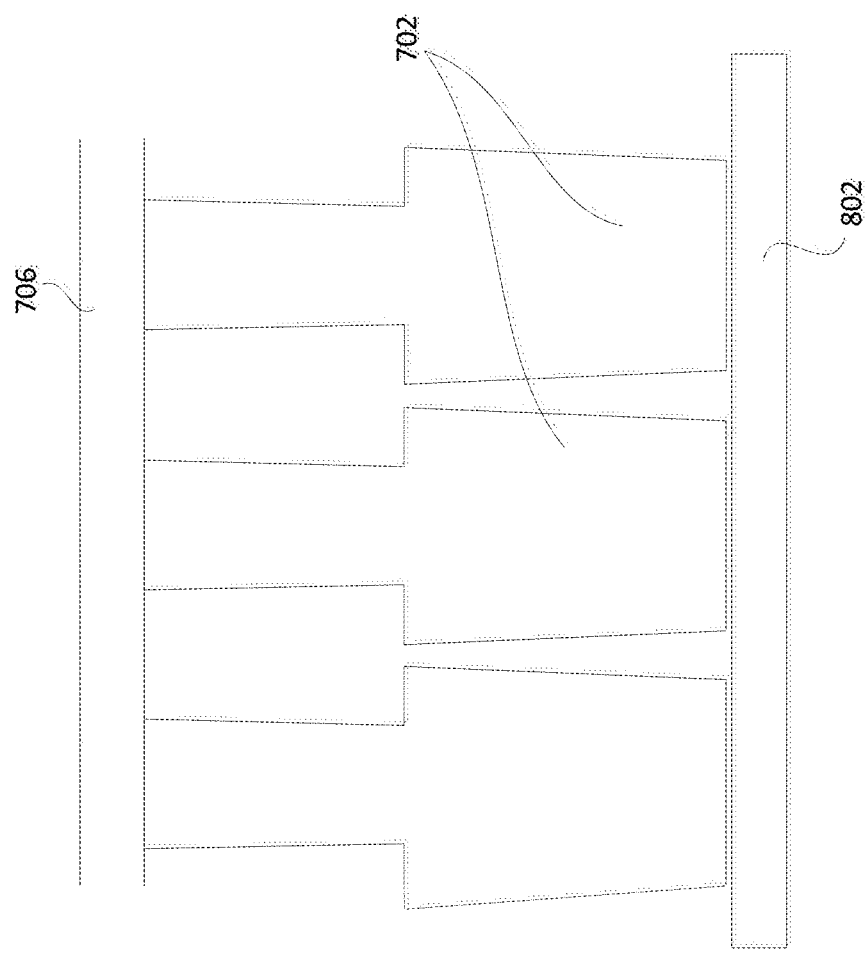
FIG. 8 is a schematic diagram of a plurality of adjacent segments for use in a bend limit film.

For example, as shown in FIG. 8, a plurality of adjacent segments 702 can be formed on a substrate 802, for example, by a single- or multi-step molding process, and then, after the segments 702 are bonded to the thin film 706, the substrate can be broken, dissolved, or otherwise removed from the segments 702. In another implementation, the plurality of adjacent segments 702 can be formed on a substrate 802, for example, by a lithography and etching process, and then, after the segments 702 are bonded to the thin film 706, the substrate 802 can be broken, dissolved, or otherwise removed from the segments 702.

Figure 9:
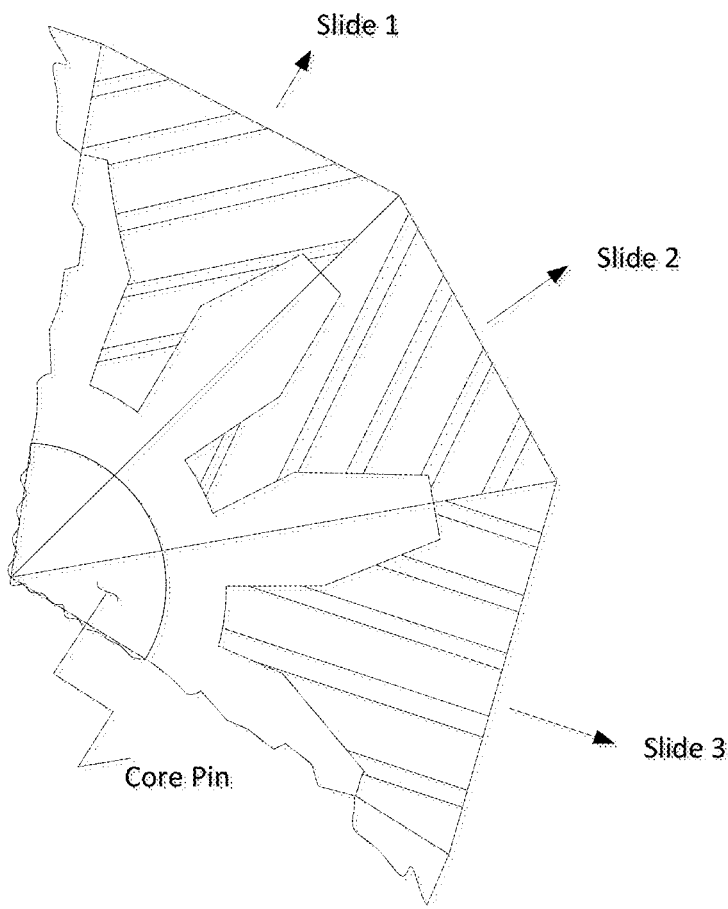
FIG. 9 is a schematic diagram of a rotating mold that can be used in an example molding process for forming the adjacent segments.

FIG. 9 is a schematic diagram of a rotating mold that can be used in an example molding process for forming the adjacent segments 702. For example, slides 1, 2, 3, etc. can be inserted radially into position with respect to a core pin, and then material can be injected into the voids between the slides and the core pin to simultaneously form the segments 702 and the thin film 706. As segments 702 are formed, the assembly can be rotated counter-clockwise and the slides can be removed in numerical order to free segments 702 from the counter-clockwise-most position in FIG. 9 while new segments are formed in positions clockwise from the counter-clockwise-most position. By using transparent tooling and an ultra-violet (UV) rapid-curing molding compound, high production throughput can be achieved.

Figure 10:
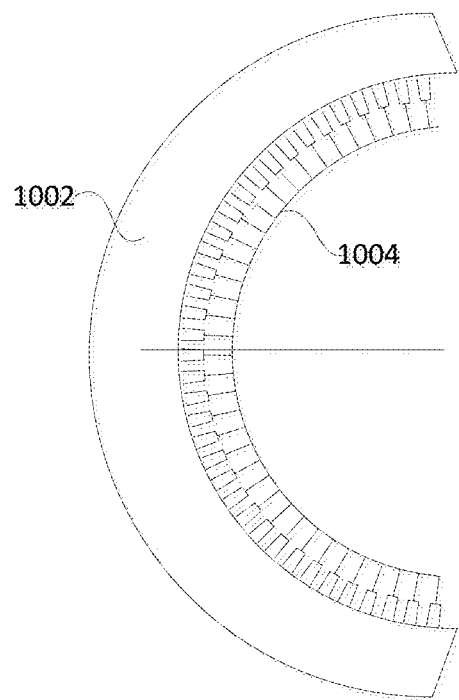
FIG. 10 is a schematic diagram of a mold that can be used for forming adjacent segments of a bend limit layer.

FIG. 10 is a schematic diagram of a mold 1002 that can be used for forming adjacent segments 702 of a bend limit layer 700. The shape of the mold 1002 can correspond to the shape of the bend limit layer 700, when the bend limit layer is in its designed limit radius configuration. Then, the adjacent segments 702 of the bend limit layer 700 can be formed as a unified part within the mold 1002, however, with engineered imperfections along the designed boundaries 1004 between adjacent segments 702. The imperfections then can allow the unified part to be cracked along the designed boundaries between the adjacent segments, so that after the bend limit layer 700 is removed from the mold 1002 and flattened the bend limit layer 700 has the separated adjacent segments 702 shown in FIG. 7A, but when the bend limit layer 700 is bent to its limit radius, the adjacent segments form strong, rugged contacts to their adjacent segments.

Figure 11:
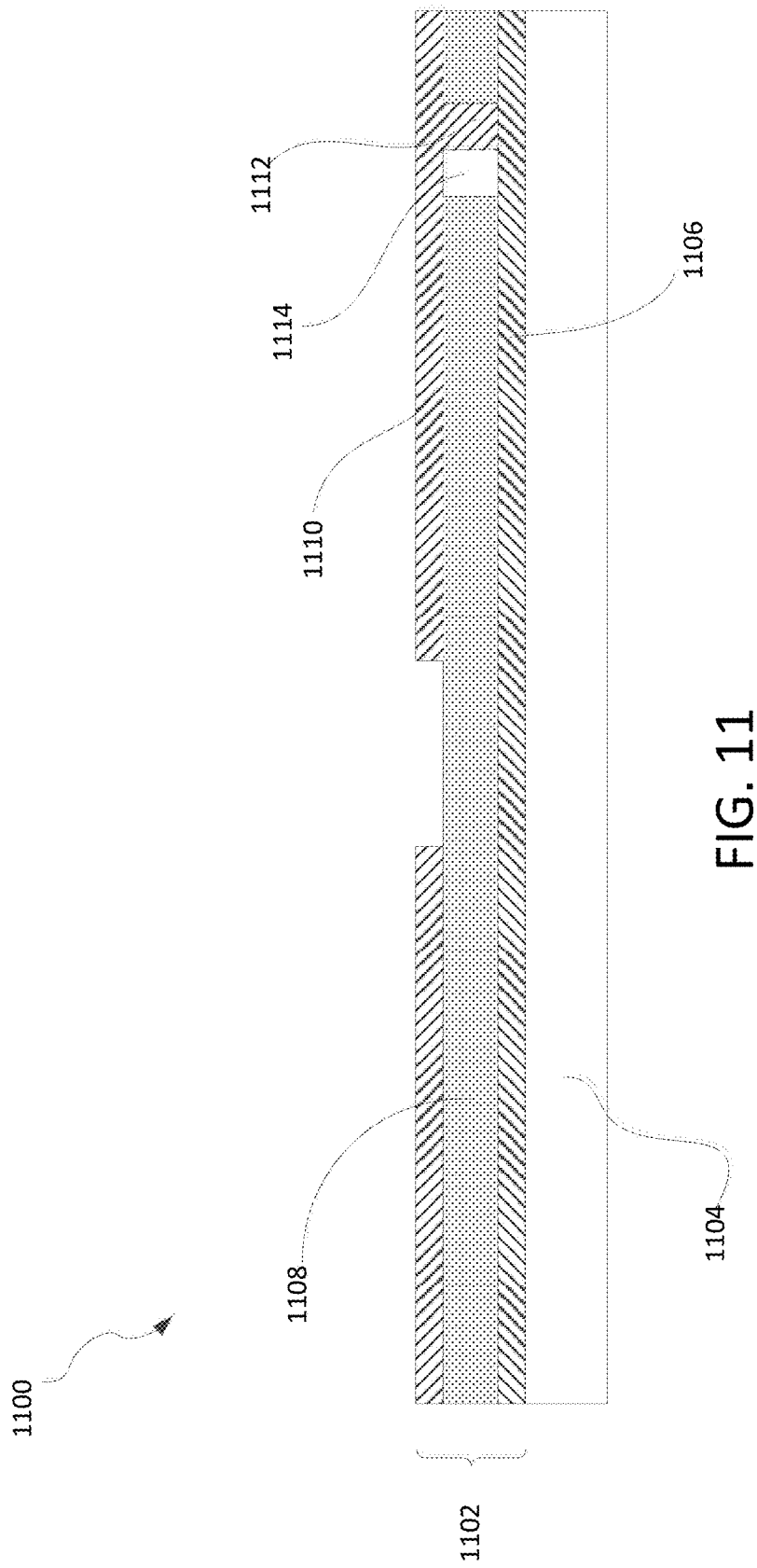
FIG. 11 is a schematic diagram of another implementation of the foldable display, in which a bend limit layer is coupled to a display layer.

FIG. 11 is a schematic diagram of another implementation of the foldable display 1100, in which a bend limit layer 1102 is coupled to a display layer 1104. The bend limit layers 1102 can include a plurality of sublayers. The sublayers can include, for example an outer layer 1106, a middle layer 1108, and an inner layer 1110. The inner layer 1110 can include one or more fingers 1112 that extends outward toward the outer layer 1106. The fingers 1112 when the bend limit layer 1102 is in a relaxed, unbent configuration, are each horizontally separated by a gap 1114, in the plane of the layers, from a portion of the middle layer 1108 that is closest to the apex of the bend of the bend limit layer 1102. Two fingers 1112 and gaps 1114 are shown in FIG. 11, but any number of fingers and corresponding gaps is possible.

The layers can be made of different materials. In one implementation the inner and outer layers 1110, 1106 can be made of an easily deformable, low stiffness metal, such as a nickel titanium alloy (e.g., Nitinol), and the middle layer can be made of a stiffer metal, such as stainless steel. The middle layer can be thicker than the inner and outer layers.

Figure 12:
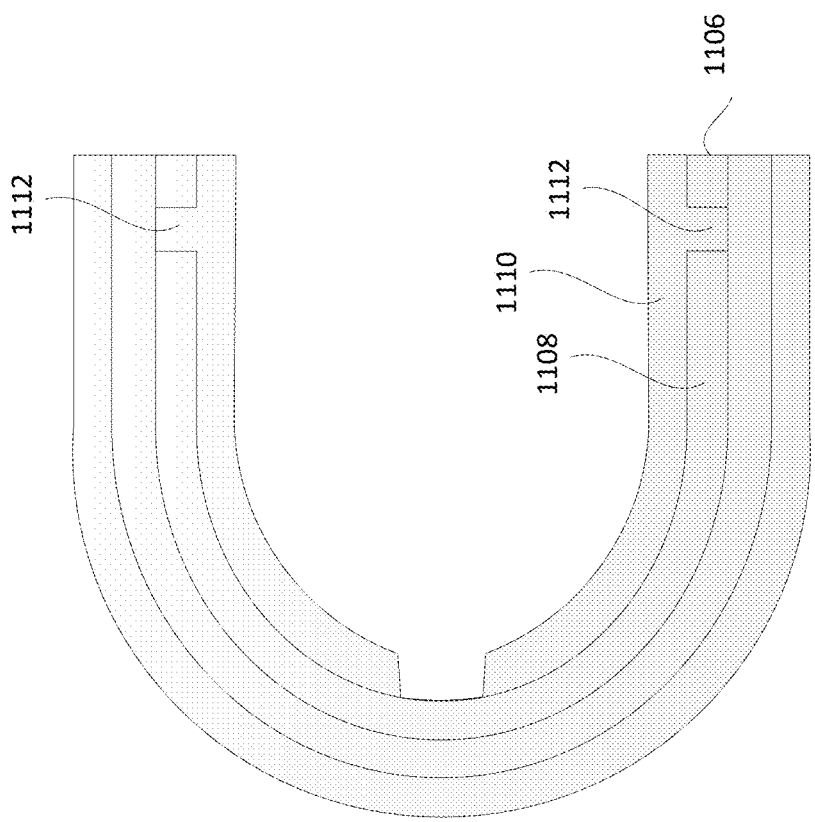
FIG. 12 is a schematic diagram of the foldable display when it is in a bent configuration.

FIG. 12 is a schematic diagram of the foldable display 1100 when it is in a bent configuration. As shown in FIG. 12, compressive strain on the inner layer at the apex of the bend due to the bending of the foldable display causes the gaps 1114 between the fingers 1112 of the inner layer and the middle layer to be closed. Thus, the sections of the inner layer 1110 can act as leaves that move across the inner layer in response to the compressive strain and that pull their corresponding fingers with them. When the gaps 1114 are closed, the stiffness of the bend limit layer 1102 increases, so that further bending of the foldable display is restricted.

Figure 13:
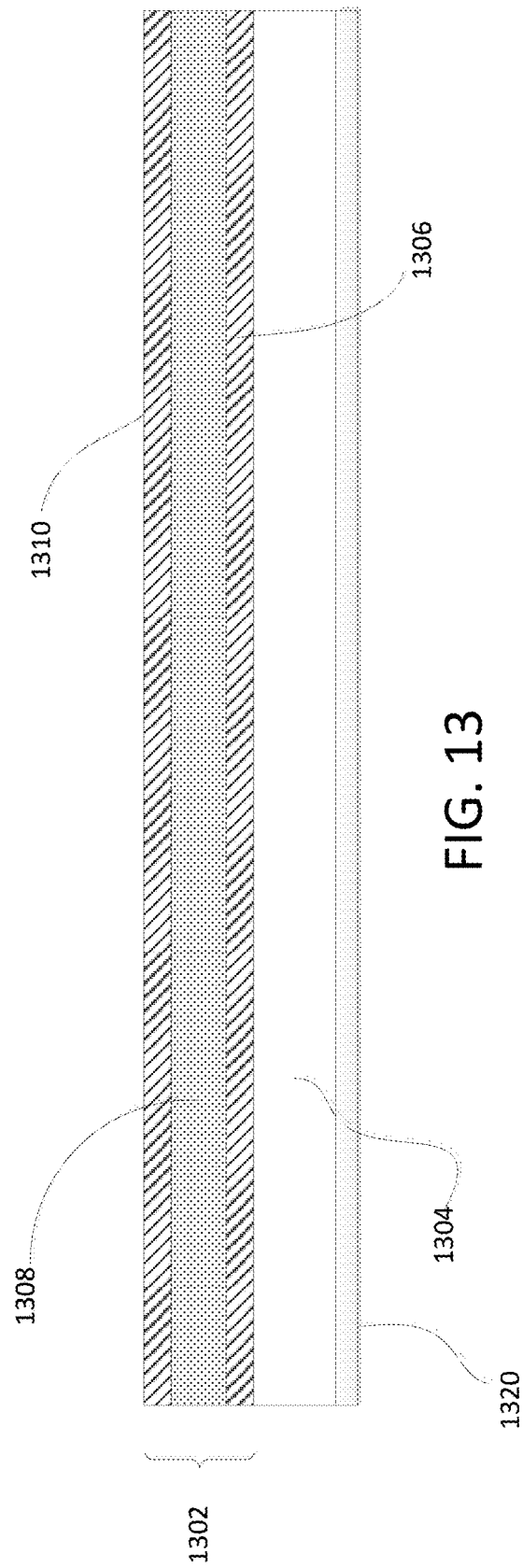
FIG. 13 is a schematic diagram of another implementation of a display in which a bend limit layer is coupled to a display layer.

FIG. 13 is a schematic diagram of another implementation of the display 1300 in which a bend limit layer 1302 is coupled to a display layer 1304 and to a monolayer unidirectional fiber reinforced backing film 1320. The bend limit layers 1302 can include a plurality of sublayers. The sublayers can include, for example, an outer skin layer 1306, a middle layer 1308, and an inner skin layer 1310. The layers can be made of different materials. In one implementation, the inner and outer layers 1310, 1306 can be made of very thin layer of a material with very high elongation (e.g. Nitinol film), and the middle layer can be made of material whose stiffness changes as a function of the bend radius of the foldable display 1300.

Figure 14:
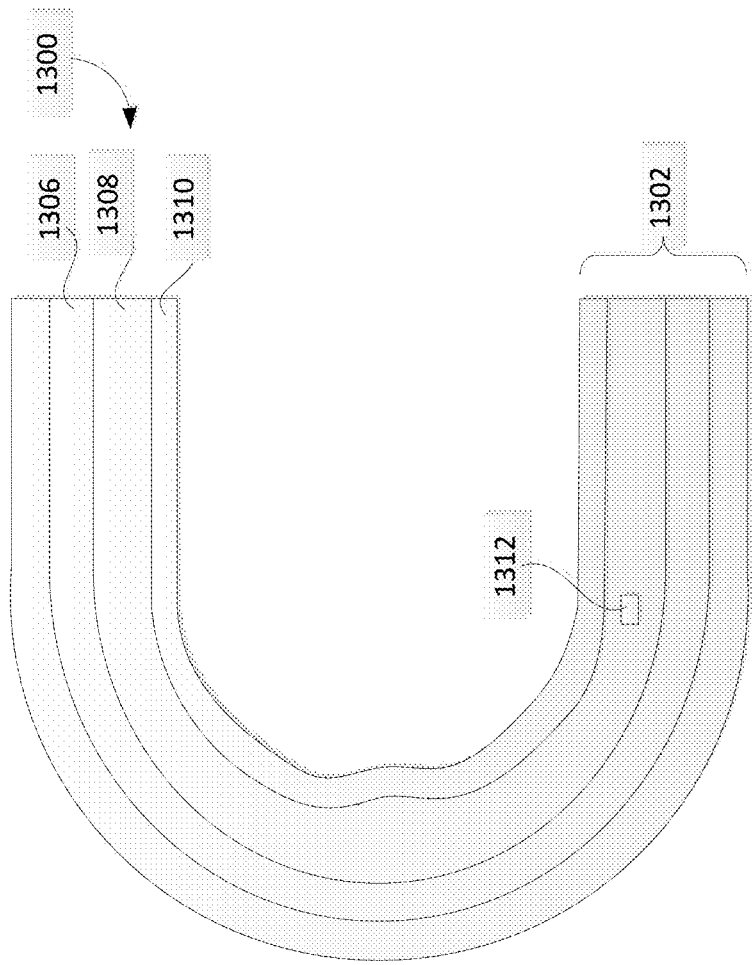
FIG. 14 is a schematic diagram of the foldable display when it is in a bent configuration.

FIG. 14 is a schematic diagram of the foldable display 1300 when it is in a bent configuration. As shown in FIG. 14, compressive strain on the inner layer 1308 due to the bending of the foldable display causes the stiffness of the middle layer 1308 to increase. This can occur in a number of different ways. In an implementation, the compressive strain on the inner layer 1310 and the middle layer 1308 causes the layers 1310, 1308 to deform inward toward the center of the bend, and the deformation of the material can increase the stiffness of the materials in the layers.

In some implementations, electro-active material can be used in middle layer 1308, where the stiffness of the electro-active material can change in response to a voltage or current that is applied to the material. The electro-active material can include, for example, (1) ferroelectric-based materials (e.g., polyvinylidene fluoride-based ferroelectric citric polymer materials), (2) ionic-based material (e.g., ionomeric polymer-metal composites (e,g, Nafion or Flemion) or electroactive polymer gels), (3) non-ionic based materials, (e.g., poly vinyl alcohol-based materials); (4) carbon nanotube or conductive particles embedded in a polymer matrix, and (5) conductive polymer based materials (e.g., Polypyrrole, Polyaniline, Polythiophene, Polyacetelene, Poly-p-phenylene, Poly-phenylene vinylene. In some implementations, the electro-active material can change its rheological properties (such as storage modulus and/or loss modules) upon the application of an electric field. In some cases, the storage modulus of the material can be changed by more than 3 orders of magnitude by applying an electric field of a few kilovolts per millimeter to the material. In some cases, the form factor of the electro-active material can be changed upon the application of a voltage to bend, twist, expand, contract or shrink the material. The electric field and/or current can be applied to the electro active material by a dedicated electrode in the stack of the display device or by one or more electronic elements present in other structures of the device (e.g., electrodes in a touch layer of the device).

In some implementations, the compressive strain on the inner layer 1310 and the middle layer 1308 can cause a changes of state of an electromechanical device (e.g., a piezoelectric device) 1312 within at least one of the layers 1310, 1308, and a signal due to the change of state can be used to cause a change in the stiffness of the middle layer 1308. For example, an electrical signal from the electromechanical device 1312 in response to the bend-induced strain can trigger an electrical current or a voltage to be applied to the materials in the middle layer, which, in turn, can cause a change of state and stiffness of the material in the middle layer. For example, the electro-active material can be changed from a liquid to a solid in response to the applied current or voltage, or material can be pumped into the bent portion of the middle layer, or the orientation of particles of material can be rearranged in response to the applied current or voltage to increase the stiffness of the bent portion. Other modalities of changes to the stiffness of the electro-active material in response to an applied electric field or current are also possible.

Figure 15:
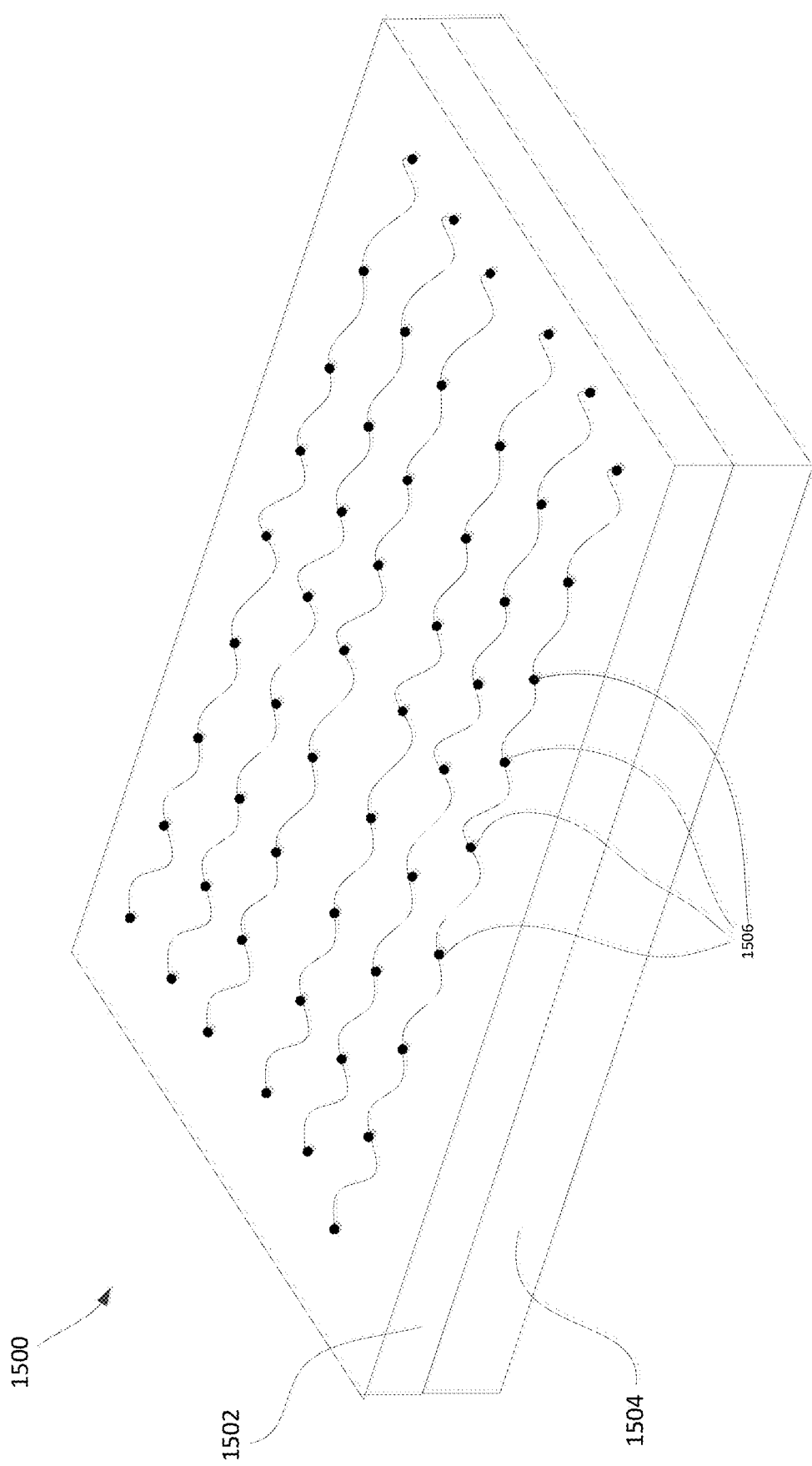
FIG. 15 is a schematic diagram of another implementation of a foldable display in which a bend limit layer is coupled to a display layer.

FIG. 15 is a schematic diagram of another implementation of the foldable display 1500 in which a bend limit layer 1502 is coupled to a display layer 1504. The content of the display can be displayed on a surface of the display that is on the opposite side of the foldable display 1500 from the bend limit layer 1502 (e.g., facing down, as shown in FIG. 15). The bend limit layer 1502 can include a plurality of threads or fibers arranged across the layer 1502 in a plane and that, when the bend limit layer 1502 is in a flat configuration, are arranged in a serpentine configuration, so that the length of each fibers is longer than the straight end-to-end distance in the plane between the ends of each fiber. The fibers can be made of strong, low-stretch material, such as, for example, fibers made from glass, Kevlar®, graphite, carbon fiber, ceramics, etc. and can be laid down in a low modulus substrate. For example, the fibers can be laid down via a spread tow technique in the desired pattern using specialized manufacturing equipment. The fibers can be pinned at locations 1506 along their lengths to a layer of the foldable display, e.g., to a substrate in the bend limit layer 1502 or to an surface at interface between the bend limit layer 1502 and the display layer 1504. For example, the fibers can be pinned at nodes of the serpentine configuration of the fibers. The pinning can be performed by a number of different techniques. For example, a laser heating process may bond the fibers at the pinning sites to the layer, or the fibers can be mechanically bonded at the sites.

The fibers can limit the bend radius of the foldable display 1500 when the display is bent, when the bend limit layer 1502 is on the outside of the bend and the display layer 1504 is on the inside of the bend, because the fibers can become straight and limit the bend radius of the foldable display when the desired minimum bend radius is reached. In other words, the resistance of the bend limit layer 1502 to tensile strain in the layer is very low while the fibers are unstretched and then becomes high when the fibers are stretched to their full lengths. With the fibers bonded to material in the bend limit layer 1502 at the pinning sites, a sudden increase in stiffness of the bend limit layer occurs when the bending of the bend limit layer 1502 causes the fibers to become straight between adjacent pinning sites 1506.

Figure 16:
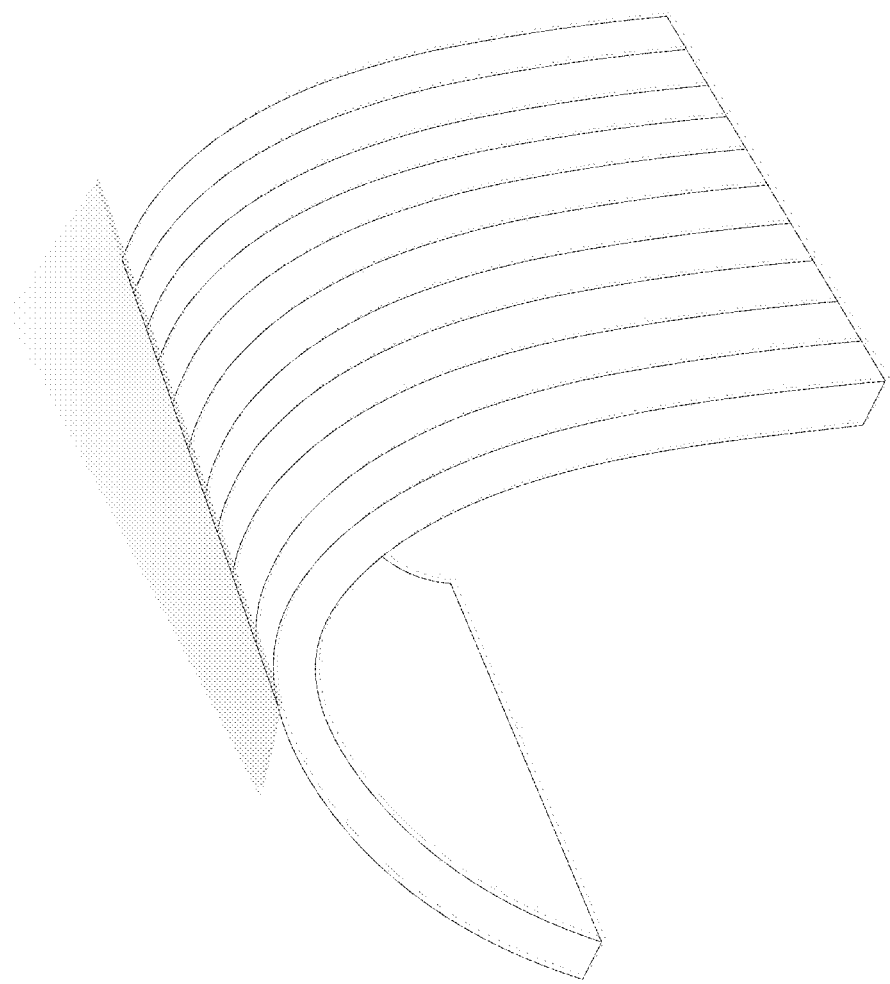
FIG. 16 is a schematic diagram of a foldable display when the display is in a bent configuration.

FIG. 16 is a schematic diagram of a foldable display 1500 when the display is in a bent configuration with the bend limit layer 1502 on the outside of the bend and with the display layer 1504 on the inside of the bend. In this configuration, when the bend limit layer is under tensile strain, the fibers can be become straight in the curved plane of the bend limit layer 1502, and the end-to-end distance, within the curved plane, of each fiber segment between adjacent pinning sites 1506 can be close to, or the same as, the length of each fiber between the adjacent pinning sites 1506. In this configuration the strong, low-stretch fibers resist the tensile strain on the bend limit layer, and thereby limit the bend radius of the foldable display 1500.

The bend limit layers 1502 can include a patterned structure of materials that can have a non-linear stiffness response to compressive forces caused by bending of the foldable display 1500.

Figure 17:
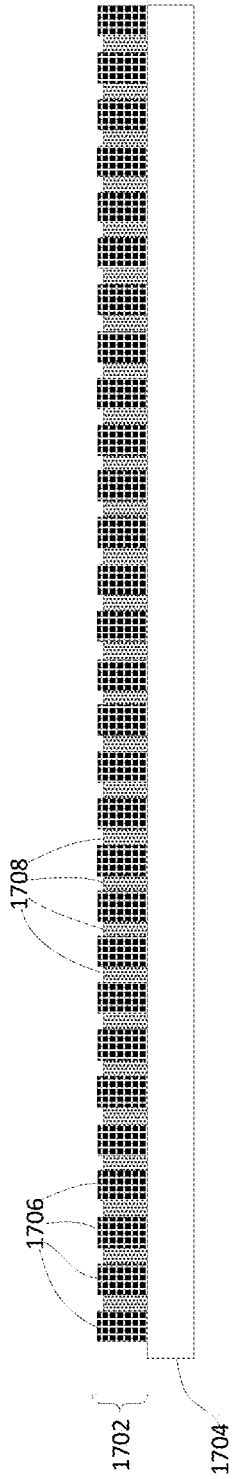
FIG. 17 is a schematic diagram of another implementation of a foldable display in which a bend limit layer is coupled to a display layer.

In one implementation, the patterned structure can include an array of ribs 1706 that extend away from the display layer 1704. As shown in FIG. 17, the ribs 1706 can be rectangular shaped, but other shapes are also possible. The ribs 1706 can be relatively rigid, in that they have a high bulk modulus and a high shear modulus. Therefore, the ribs 1706 retain their shape when the foldable display 1700 is bent. The ribs can include a variety of different rigid materials, including, for example, metals (e.g., aluminum, copper, steel, etc.) ceramic materials, glass materials, etc.

Gaps or trenches 1708 between adjacent ribs 1706 can be partially or fully filled with a second material that has a non-linear stiffness response to compressive forces caused by bending of the foldable display 1700. The material can include a foam (e.g., and open cell foam), a gel, or other material whose bulk modulus changes as a function of the compressive forces on the material.

When the bend limit layer 1702 is in a relaxed, unbent configuration, as shown in FIG. 17, the material in the gaps 1708 between the ribs 1706 can have a low bulk modulus and a low stiffness. For example, in the relaxed unbent configuration, the gaps 1708 can be filled with the non-linear stiffness material. The distance between adjacent ribs at the distal ends of the ribs (i.e., away from the display layer 1704) can be approximately equal to the distance between adjacent ribs 1706 at the proximate ends of the ribs (i.e. closest to the display layer 1704).

Figure 18:
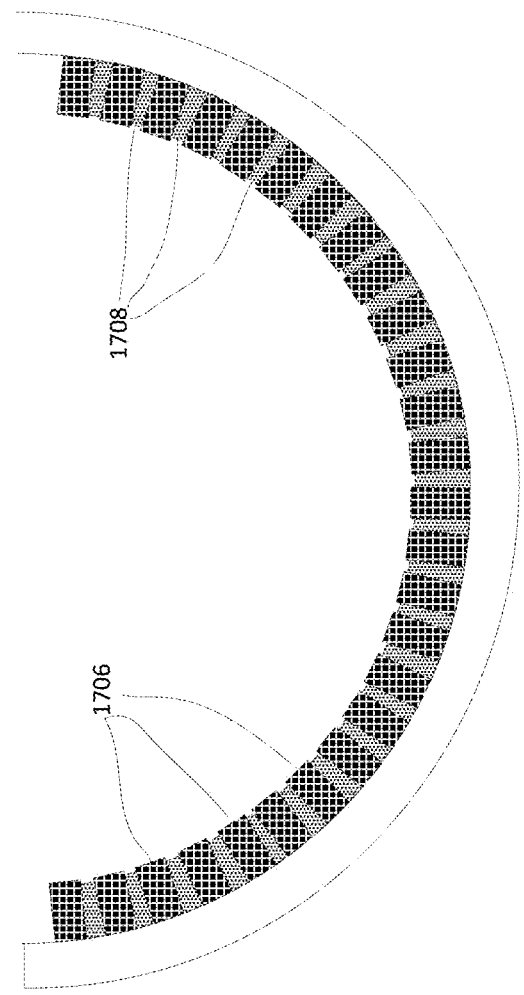
FIG. 18 is a schematic diagram of the foldable display when it is in a bent configuration.

FIG. 18 is a schematic diagram of the foldable display 1700 when it is in a bent configuration. As shown in FIG. 18, compressive strain at the interface of the display layer 1704 and the bend limit layer 1702 layer can cause the distance between adjacent ribs 1706 at the proximate ends of the ribs to be less than when the bend limit layer 1702 is in its relaxed, unbent configuration. In addition, because of the bend of the bend limit layer 1702 and the non-zero length of the ribs the distance between adjacent ribs at the distal ends of the ribs 1706 is even shorter when the bend limit layer 1702 is in the bent configuration than when in the unbent configuration. Consequently, the material in the in gaps or trenches 1708 between the ribs 1706 is squeezed when the layer 1702 is bent. The squeezing of the material can cause a sudden increase in the stiffness of the material when the radius of the bend becomes less than a threshold radius. For example, in the case of an open cell foam material in the gaps 1708 between the ribs 1706, air can be squeezed of the cells when the material is compressed, and when a critical amount of air has been squeezed from the material when the radius reaches the threshold radius, then the stiffness of the material can suddenly increase.

Figure 19A:
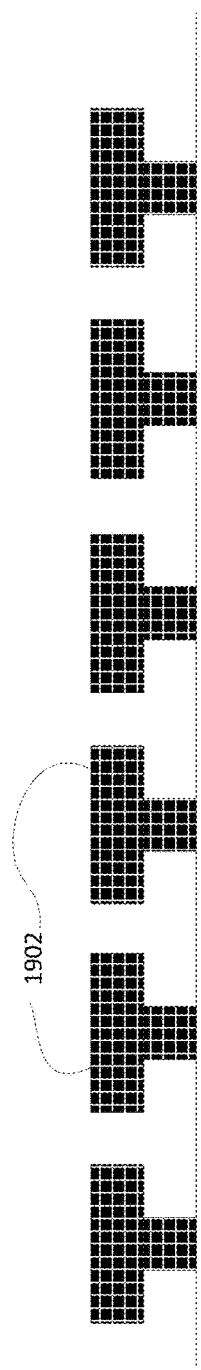
FIGS. 19A, 19B, 19C, 19D are schematic diagrams of details of the foldable display of FIGS. 17 and 18.
Figure 19B:
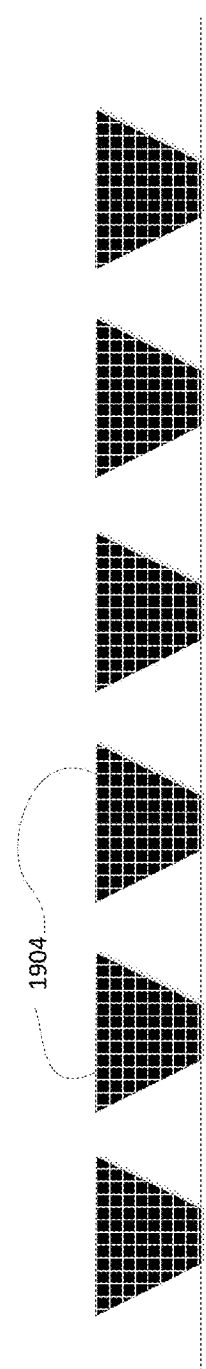
Figure 19C:
Figure 19D:
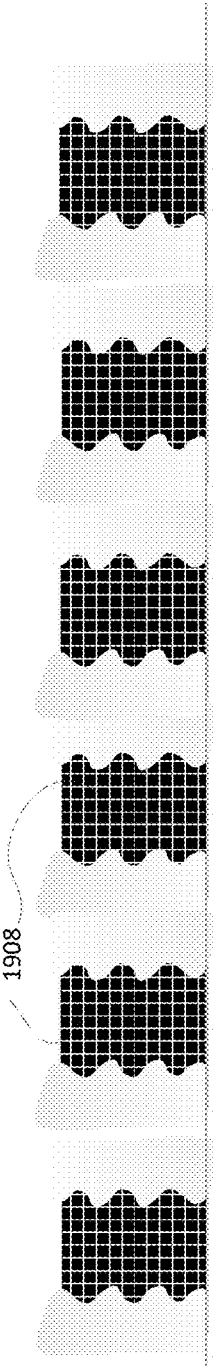

Although rectangular ribs 1706 are illustrated in FIGS. 17 and 18, and rectangular gaps 1708 between the ribs 1706 are shown in FIG. 17, other shapes of both the ribs and the material in the gaps between the ribs are possible. For example, as shown in FIG. 19A, ribs 1902 can be generally T-shaped profile. In another example, as shown in FIG. 19B, ribs 1904 can have a generally trapezoid-shaped profile. In another example, as shown in FIG. 19C, ribs 1906 can have a profile that is narrower in the middle than at the top and the bottom of the ribs. In another example, as shown in FIG. 19D, ribs 1908 can have a custom shaped profile that is configured, in conjunction with the type and shape of the material in the gaps between the ribs to accomplish a desired stiffness vs. bend radius response.

Figure 20A:
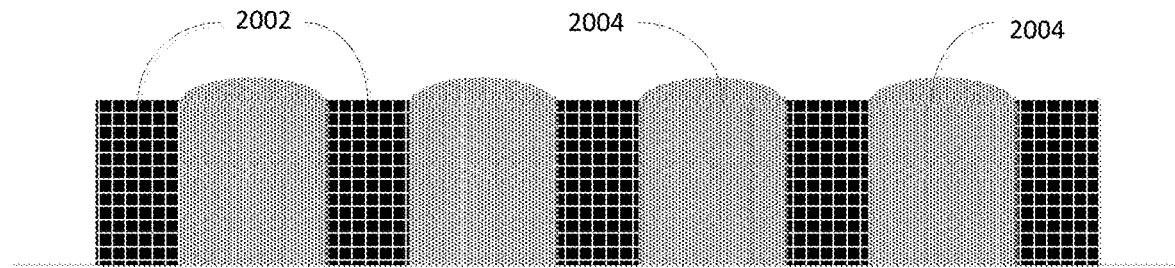
FIGS. 20A, 20B, 20C, and 20D are schematic diagrams of details of the foldable display of FIGS. 17 and 18.
Figure 20B:
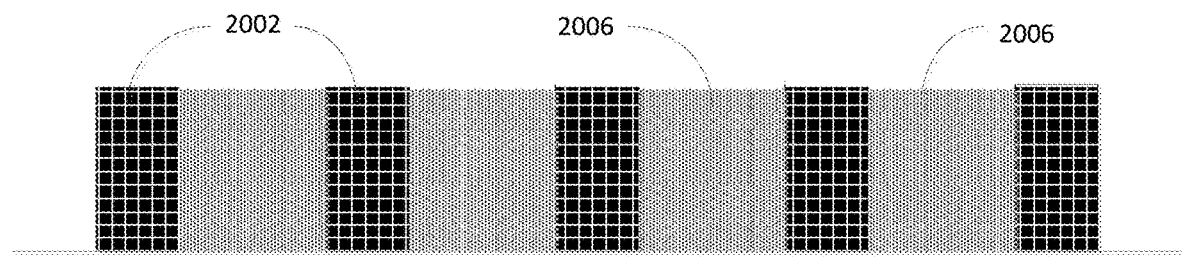
Figure 20C:
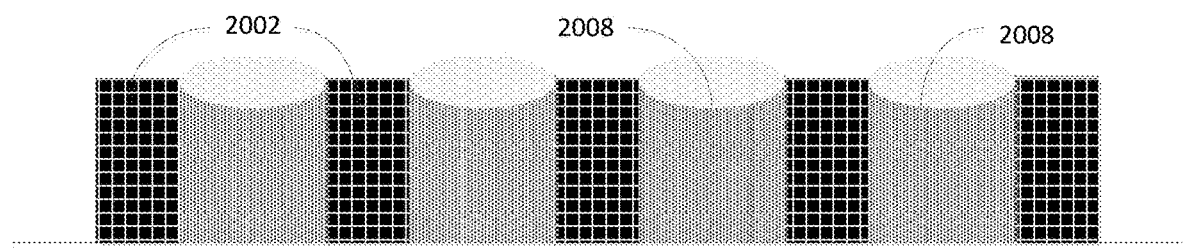
Figure 20D:
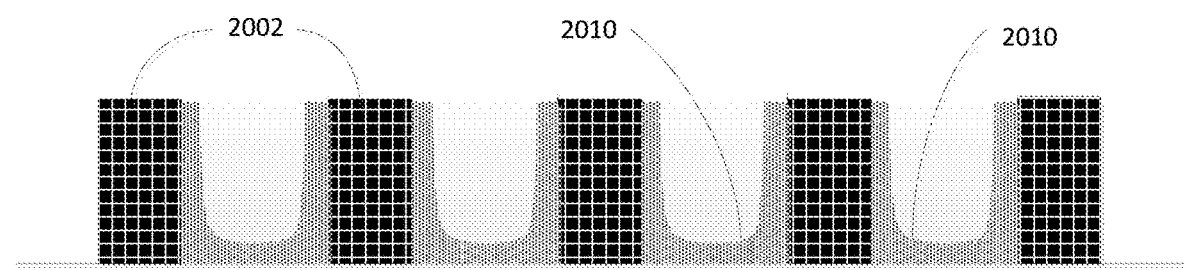

Correspondingly, the shape of the materials in the gaps between the ribs, which materials have a non-linear stiffness response to the radius of curvature of the bend limit film, can have different shapes. For example, FIGS. 20A, 20B, 20C, and 20D show rectangular gaps between rectangular ribs 2002, but with the materials in the gaps having different shapes in the different figures. For example, as shown in FIG. 20A, the rectangular gaps can be filled with non-linear stiffness response material 2004 that bulges above the tops of the gaps when the bend limit layer is in its relaxed configuration. In another example, as shown in FIG. 20B, the rectangular gaps can be filled with non-linear stiffness response material 2006 that precisely fills the rectangular gaps when the bend limit layer is in its relaxed configuration. In another example, as shown in FIG. 20C, the rectangular gaps can be filled with non-linear stiffness response material 2008 that descends below the tops of the gaps when the bend limit layer is in its relaxed configuration. In another example, as shown in FIG. 20D, the rectangular gaps can be filled with non-linear stiffness response material 2010 along the sides and bottom of the gaps, but on in the central portion of the gaps. The type and shape of the material in the gaps between the ribs can be selected to accomplish a desired stiffness response to the bend radius response of the bend limit layer.

FIG. 21 is a schematic diagram of a foldable display 2100 having a bendable section 2101 that is bent around a minimum radius, $R_{min}$. The foldable display 2100 can include a display layer 2102 that includes components (e.g., OLED layers, TFT layers, touch screen layers, polarizing layers, etc.) that generate images on the foldable display and a bend limit layer 2104 that limits the radius at which the foldable display 2100 can bend to greater than or equal to the minimum radius, $R_{min}$. The bend limit layer 2104 is coupled to the display layer 2102 by a coupling layer 2103. The coupling layer 2103 can include, for example, an adhesive material or a bonding material on respective surfaces that touch the display layer 2102 and the bend limit layer 2104.

As described above, when the display layer 2102 is fabricated in a flat configuration, bending the display layer 2102 induces compressive strain along the inner radius of the bend, and tensile strain is induced along the outer radius of the bend. It is desirable to keep the neutral plane 2106 of the assembly, at which no stain occurs in response to the bending, at, or close to, the plane in which fragile and sensitive components of the assembly (e.g., TFTs) exist. Thus, the coupling layer 2103 can include low modulus material (e.g., rubber, gel, etc.), so that little strain within the planes of the layers is transmitted between the display layer 2102 and the bend limit layer 2104. In some implementations, the display 2100 can include an additional layer 2110 on the opposite side of the display layer 2102 from the bend limit layer and that functions to maintain the neutral plane close to its designed location within the display layer 2102 when the bend limit layer 2104 acts to limit the bend radius of the display 2100. For example the additional layer 2110 can have a stiffness that compensates for the effect of the stiffness of the bend limit layer on the position of the neutral plane, so that the neutral plane does not shift from its designed location in the display layer 2102 when the display layer 2102 is coupled to the bend limit layer 2104.

The devices and apparatuses described herein can be included as part of a computing device, that includes, for example, a processor for executing instructions and a memory for storing the executable instructions. Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computing device comprising:
memory configured for storing executable instructions;
a processor configured for executing the instructions;
a foldable display layer configured for displaying information in response to the execution of the instructions;
a bend limit layer coupled to the foldable display layer and arranged substantially parallel to a display surface of the foldable display layer, the bend limit layer configured to increase its stiffness non-linearly when a radius of a bend of the bend limit layer is less than a threshold radius of curvature of the foldable display layer, the threshold radius of curvature being greater than 1 mm and less than 20 mm; and
a backing film coupled to the bend limit layer, the backing film including aligned fibers embedded in a polymer matrix, wherein the fibers have a coefficient of thermal expansion within 50% of the coefficient of thermal expansion of the display layer and wherein the fibers include a ceramic material.

2. The computing device of claim 1, wherein the bend limit layer includes:
a film; and
a plurality of distinct segments attached to the film and that are physically separated from each other when the radius of curvature of the foldable display layer is greater than the threshold radius and that are in physical contact with neighboring segments when the radius of curvature of the foldable display layer is less than or equal to the threshold radius.

3. The computing device of claim 2, wherein the display surface of the foldable display layer forms a concave surface of the foldable display layer when the foldable display layer is in a folded state.

4. The computing device of claim 2, wherein the display surface of the foldable display layer forms a convex surface of the foldable display layer when the foldable display layer is in a folded state.

5. The computing device of claim 1, wherein the bend limit layer includes a nickel titanium alloy material.

6. The computing device of claim 1, wherein the backing film is disposed between the bend limit layer and the display layer.

7. The computing device of claim 1, wherein the fibers have a coefficient of thermal expansion within 25% of the coefficient of thermal expansion of the display layer.

8. The computing device of claim 1, wherein a combined thickness of the backing film, the display layer, and the bend limit layer is less than one millimeter.

9. The computing device of claim 1, wherein a neutral plane at which no strain is induced when the foldable display layer and the bend limit layer are bent exists within the display layer.

10. The computing device of claim 9, wherein the display layer includes a plurality of thin film transistors (TFTs) arranged in a plane, and wherein a location of the neutral plane in the display layer corresponds to the plane that includes the TFTs.

* * * * *